United States Patent
Masuyama et al.

(10) Patent No.: US 7,479,870 B2
(45) Date of Patent: Jan. 20, 2009

(54) METHOD AND APPARATUS FOR PROGRAMMING A TRANSPONDER

(75) Inventors: Jinsaku Masuyama, Cedar Park, TX (US); Thad McMillan, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 324 days.

(21) Appl. No.: 11/401,058

(22) Filed: Apr. 10, 2006

(65) Prior Publication Data

US 2007/0247287 A1    Oct. 25, 2007

(51) Int. Cl.
*H04Q 5/22* (2006.01)

(52) U.S. Cl. ............... 340/10.51; 340/10.52; 340/10.1; 340/572.1; 340/572.4

(58) Field of Classification Search ...... 340/571–572.9, 340/5.6–5.61, 5.8, 10.1, 10.42; 235/451, 235/375, 383–385, 462.1, 462.07
See application file for complete search history.

(56) References Cited

U.S. PATENT DOCUMENTS

| | | | | |
|---|---|---|---|---|
| 5,838,253 | A * | 11/1998 | Wurz et al. ............... | 340/10.42 |
| 6,130,613 | A * | 10/2000 | Eberhardt et al. ......... | 340/572.7 |
| 6,481,907 | B2 * | 11/2002 | Banach et al. ........... | 400/615.2 |
| 6,593,853 | B1 * | 7/2003 | Barrett et al. ............ | 340/572.1 |
| 6,929,412 | B1 | 8/2005 | Barrus et al. | |
| 7,073,712 | B2 * | 7/2006 | Jusas et al. .................. | 235/451 |
| 7,114,655 | B2 * | 10/2006 | Chapman et al. ....... | 235/462.01 |
| 7,261,479 | B2 * | 8/2007 | Barrus et al. .................. | 400/76 |
| 2006/0139662 | A1 * | 6/2006 | Sugiyama ................... | 358/1.5 |

* cited by examiner

*Primary Examiner*—George A Bugg
*Assistant Examiner*—Son M Tang
(74) *Attorney, Agent, or Firm*—Haynes and Hoone, LLP

(57) ABSTRACT

A radio frequency identification transponder apparatus includes a transceiver. A control logic device is coupled to the transceiver. A transponder programming device is coupled to the control logic device and operable to store information, whereby the information stored is determined by the presence or absence of a printing material adjacent the transponder programming device. A conventional printing device may program the transponder programming apparatus and print transponder labels by positioning printing material adjacent the transponder programming device.

26 Claims, 6 Drawing Sheets

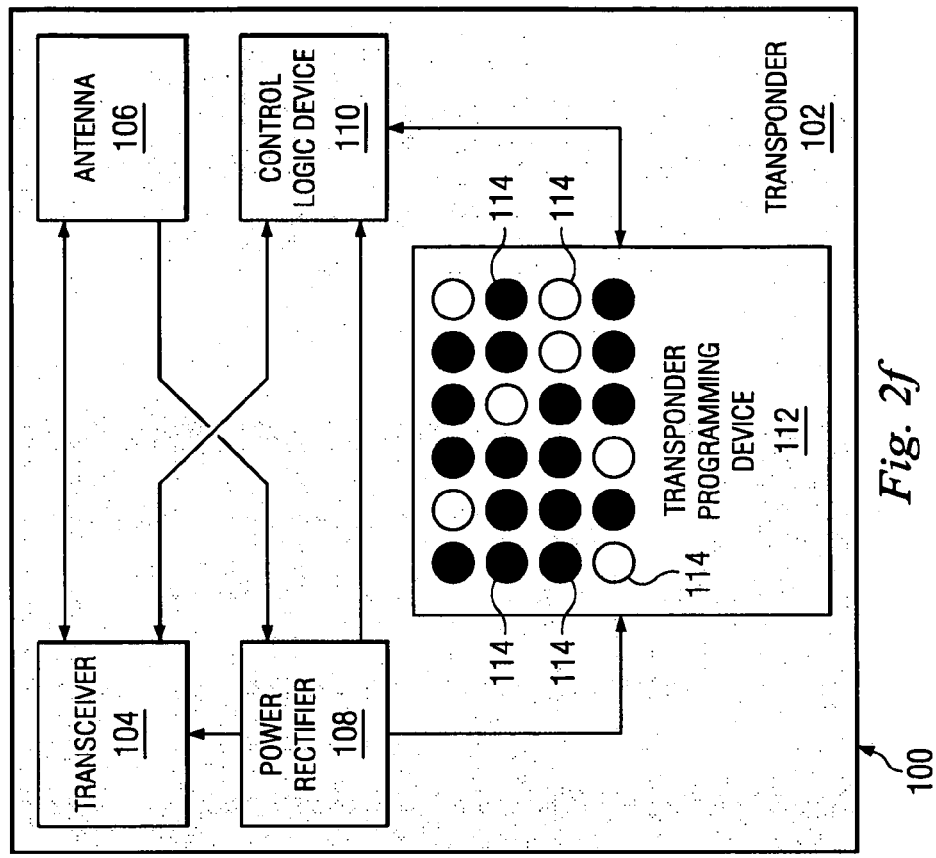
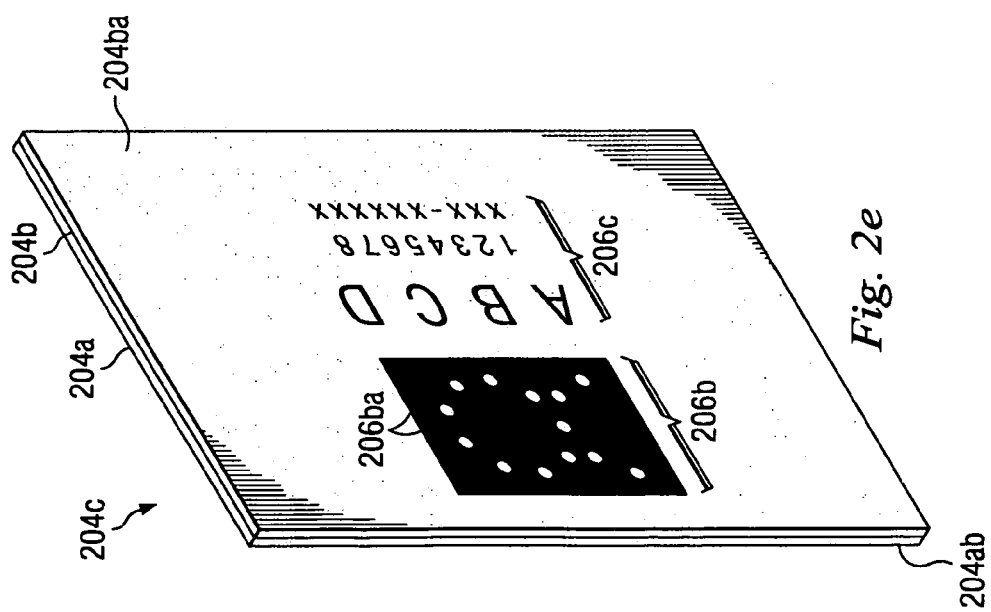
Fig. 2f
Fig. 2e

METHOD AND APPARATUS FOR PROGRAMMING A TRANSPONDER

BACKGROUND

The present disclosure relates generally to transponders, and more particularly to programming a radio frequency identification (RFID) transponder.

Transponders such as, for example, RFID transponders, may be used to track objects. RFID transponders are wireless electronic tags which broadcast preprogrammed data stored in a non-volatile memory. The RFID transponder is typically programmed to identify an object and then coupled to that object such that an RFID transceiver can receive the broadcast from the RFID transponder in order to identify the object. The programming of the RFID transponder raises a number of issues.

Conventionally, RFID transponders includes an electronically erasable programmable read only memory (EEPROM) which may be programmed by an RFID transceiver using radio waves. However, sometimes it is desirable to include a label on the RFID transponder which allows human-readable information to be printed on the RFID transponder in order to provide a single object tag which may be coupled to an object and read by both machines and humans.

In order to create these RFID transponder labels, an RFID transponder label printer is typically provided. The RFID transponder is included in a label which may be printed on. The RFID transponder label printer includes an RFID transceiver such that the RFID transponder label printer may be used to print the object information on the label while programming the RFID transponder with information corresponding to the object.

However, this method for programming a transponder requires that a user have the RFID transponder label printer, as a conventional printer does not include the RFID transceiver necessary to program the RFID transponder. This results in increased costs to the user, as the user must purchase a relatively expensive RFID transponder label printer to create RFID transponder labels.

Accordingly, it would be desirable to provide for programming a transponder absent the disadvantages discussed above.

SUMMARY

According to one embodiment, a transponder apparatus includes a transceiver, a control logic device coupled to the transceiver, and a transponder programming device coupled to the control logic device and operable to store information, whereby the information stored is determined by the presence or absence of printing material adjacent the transponder programming device.

BRIEF DESCRIPTION OF THE DRAWINGS

FIG. 2e is a perspective view illustrating an embodiment of the transponder label of FIG. 2c programmed with a printing material positioned adjacent the transponder apparatus of FIG. 1.

FIG. 2f is a schematic view illustrating an embodiment of the transponder apparatus of FIG. 1 programmed with a printing material positioned adjacent the transponder apparatus.

DETAILED DESCRIPTION

Figure 1:
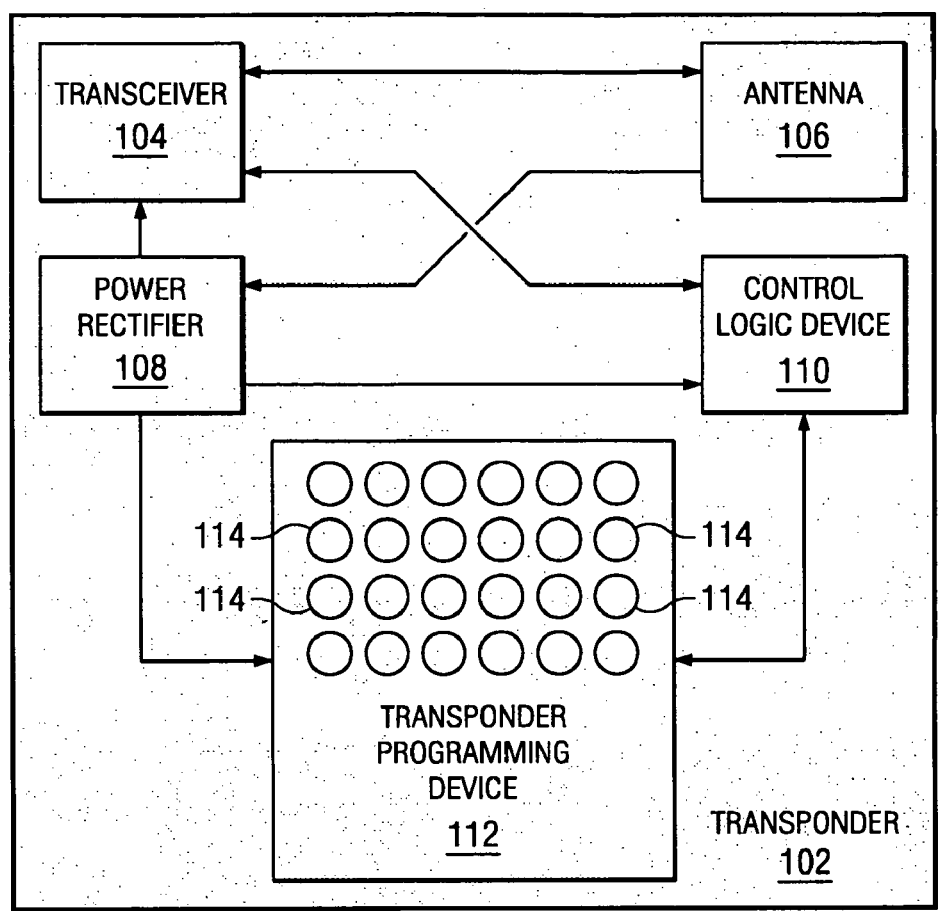
FIG. 1 is a schematic view illustrating an embodiment of a transponder apparatus.

Referring now to FIG. 1, a transponder apparatus 100 is illustrated. The transponder apparatus 100 includes a transponder 102 including a conventional transceiver 104, a conventional antenna 106, a conventional power rectifier 108, a conventional control logic device 110, and a transponder programming device 112, each coupled to the transponder 102 and to each other as described in further detail below.

The conventional transceiver 104 is a device known in the art which is capable of sending and receiving signals. The transceiver 104 is operably coupled to the antenna 106 such that the transceiver 104 may send signals to and receive signals from the antenna 106. The transceiver 104 is operably coupled to the control logic device 110 such that the transceiver 104 may send signals to and receive signals from the control logic device 110. The transceiver 104 is operably coupled to the power rectifier 108 such that the transceiver 104 may receive power from the power rectifier 108.

The conventional antenna 106 is a device known in the art which is capable of radiating and receiving radio signals. The antenna 106 is operably coupled to the transceiver 104 such that the antenna 106 may send signals to and receive signals from the transceiver 104. The antenna 106 is operably coupled to the power rectifier 108 such that the antenna 106 may send signals to the power rectifier 108.

The conventional power rectifier 108 is a device known in the art which is capable of receiving a signal from the antenna 106 and converting the energy from that signal into power which may then be sent to components of the transponder 102. The power rectifier 108 is operably coupled to the transceiver 104 such that the power rectifier 108 may send power to the transceiver 104. The power rectifier 108 is operably coupled to the antenna 106 such that the power rectifier 108 may receive signals from the antenna 106. The power rectifier 108 is operably coupled to the control logic device 110 such that the power rectifier 108 may send power to the control logic device 110. The power rectifier 108 is operably coupled to the transponder programming device 112 such that the power rectifier 108 may send power to the transponder programming device 112.

The conventional control logic device 110 is a device known in the art which is capable of controlling components of the transponder 102. The control logic device 110 is operably coupled to the transceiver 104 such that the control logic device 110 may send signals to and receive signals from the transceiver 104. The control logic device 110 is operably coupled to the power rectifier 108 such that the control logic device 110 may receive power from the power rectifier 108. The control logic device 110 is operably coupled to the transponder programming device 112 such that the control logic device 110 may send signals to and receive signals from the transponder programming device 112.

The transponder programming device 112 is operably coupled to the power rectifier 108 such that the transponder programming device 112 may receive power from the power rectifier 108. The transponder programming device 112 is operably coupled to the control logic device 110 such that the transponder programming device 112 may send signals to and receive signals from the control logic device 110. In an embodiment, the transponder programming device 112 includes an array of one or more transponder programming cells 114, as illustrated in FIG. 1. In an embodiment, the transponder programming device 112 may include as few as one transponder programming cell 114 or as many transponder programming cells 114 as are needed depending on the amount of information the transponder programming device 112 is being designed to hold. In an embodiment, the transponder programming device 112 includes a photo-sensitive device and the transponder programming cells 114 include photo-sensitive cells such as, for example, photo-transistors, photo-diodes, solar cells, combinations thereof, and/or a variety of other photo-sensitive cells known in the art. In an embodiment, the transponder programming device 112 includes an electromagnetic-sensitive device and the transponder programming cells 114 include electromagnetic-sensitive cells such as, for example, Hall Effect transistors and/or a variety of other electromagnetic-sensitive cells known in the art. In an embodiment, the transponder programming device 112 includes a chemical-sensitive device and the transponder programming cells 114 include chemical-sensitive cells. In an embodiment, the transponder programming device 112 includes a plurality of conductive cells 114 such as, for example, transistors, copper pads, and/or a variety of other conductive cells known in the art.

Figure 2A:
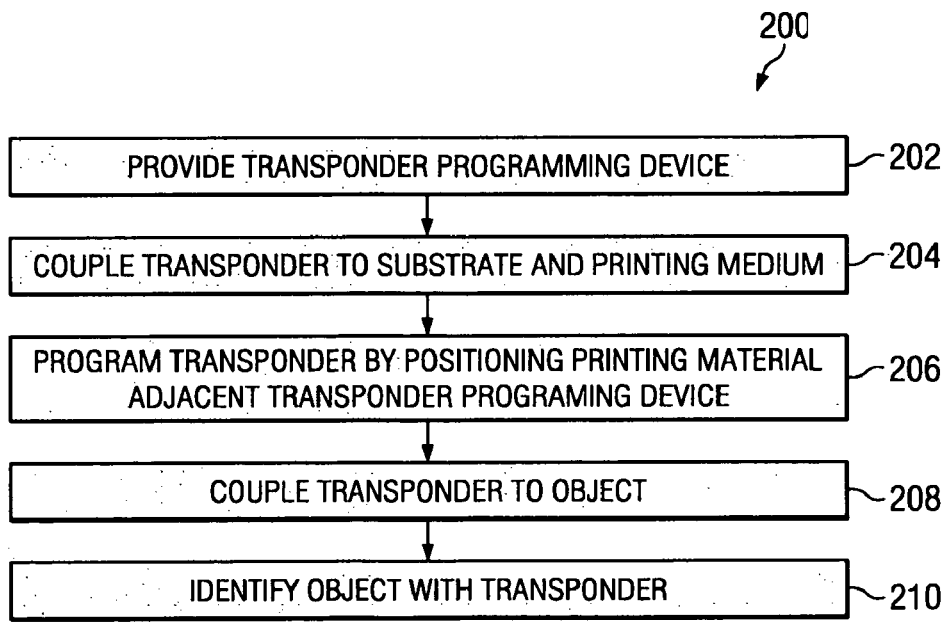
FIG. 2a is a flow chart illustrating an embodiment of a method for programming a transponder.
Figure 2B:
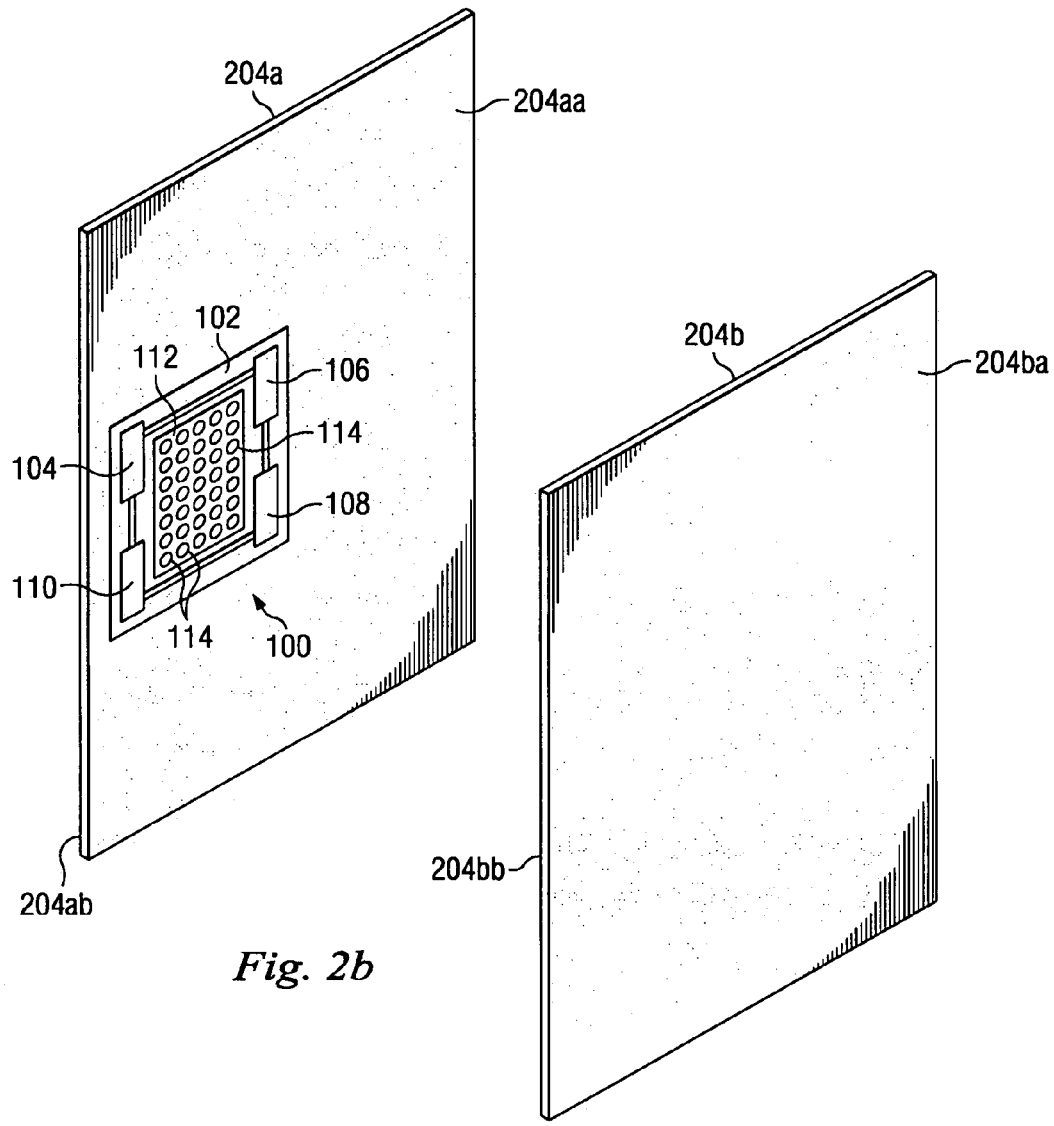
FIG. 2b is an exploded view illustrating an embodiment of the transponder apparatus of FIG. 1 coupled to a substrate.
Figure 2C:
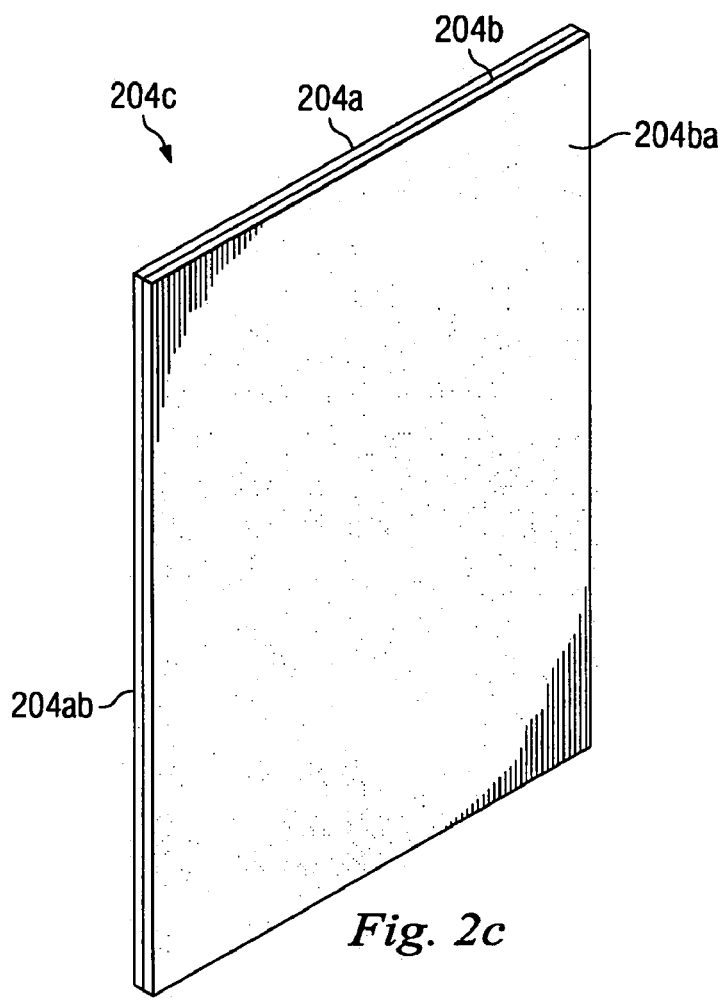
FIG. 2c is an perspective view illustrating an embodiment of the transponder apparatus of FIG. 1 coupled to a substrate with a printing medium coupled to the substrate to provide a transponder label.

Referring now to FIGS. 2a, 2b, and 2c, a method 200 for programming a transponder is illustrated. The method 200 begins at step 202 where the transponder apparatus 100, described above with reference to FIG. 1, is provided. The method 200 then proceeds to step 204 where the transponder apparatus 100 is coupled to a substrate and a printing medium. In an embodiment, the transponder apparatus 100 is coupled to a substrate 204a having a front surface 204aa and a rear surface 204ab located opposite the front surface 204aa. In an embodiment, the front surface 204aa and/or the rear surface 204ab of the substrate 204a may include an adhesive known in the art. A printing medium 204b is provided having a front surface 204ba and a rear surface 204bb located opposite the front surface 204ba. In an embodiment, the rear surface 204bb of the printing medium 204b may include an adhesive known in the art. The printing medium 204b is coupled to the substrate 204a such that the rear surface 204bb of the printing medium 204b is located adjacent the front surface 204aa of the substrate 204a and the printing medium 204b is located adjacent the transponder apparatus 100, as illustrated in FIG. 2c, providing an transponder label 204c. In an embodiment, the printing medium 204b is at least partially translucent such that light may be detected by the transponder programming device 112 through the printing medium 204b. In an embodiment, the substrate 204a and the printing medium 204b provide a conventional sticker or label with the transponder apparatus 100 embedded. However, in an embodiment, the transponder apparatus 100 may be embedded in a variety of other mediums such as, for example, plastic, to provide the transponder apparatus 100 in, for example, a card, a key fob, a container, or a variety of other objects which are desired to be tracked. While the printing medium 204b has been illustrated as a separate material located adjacent the transponder programming device 100, in an embodiment, the printing medium may be the transponder programming device 112 itself.

Figure 2D:
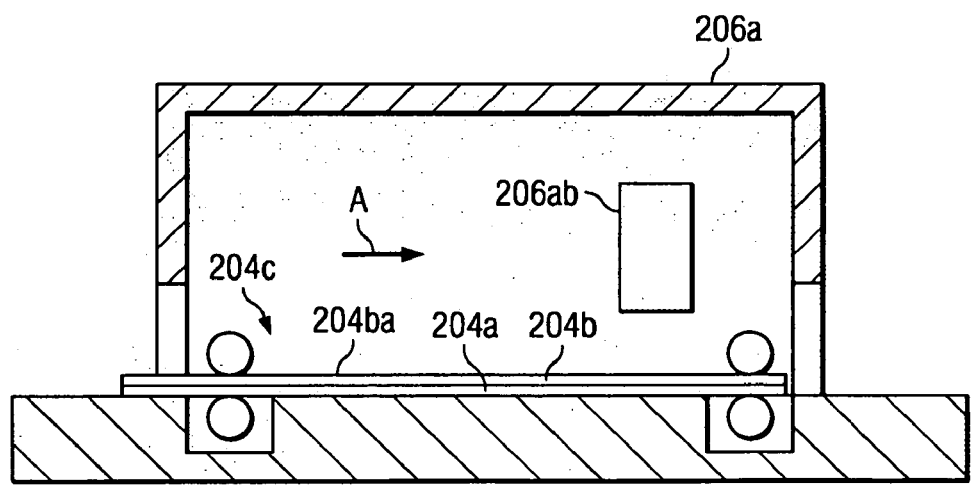
FIG. 2d is an cross sectional view illustrating an embodiment of the transponder label of FIG. 2c with a conventional printer programming the transponder apparatus of FIG. 1.

Referring now to FIGS. 2a, 2b, 2c, 2d, 2e, 2f, 2g, and 2h, the method 200 then proceeds to step 206 where the transponder 102 is programmed by positioning printing material adjacent the transponder programming device 112. A conventional printing device 206a is provided which includes a printing member 206ab containing a printing material. In an embodiment, the printing material may be any substance capable of blocking light from passing through a translucent material on which the printing material is applied such as, for example, a conventional ink, a conventional toner, any conventional masking material, and/or a variety of other printing materials known in the art. The transponder label 204 is positioned in the printing device 206a and moved in a direction A past the printing member 206ab such that printing material from the printing member 206ab may be positioned on the front surface 204ba of the printing medium 204b, as illustrated in FIG. 2d. The printing material is positioned on the printing medium 204b such that it includes a transponder programming section 206b located adjacent the transponder programming device 112 and a human-readable section 206c located adjacent the transponder programming section 206b, as illustrated in FIG. 2e. In an embodiment, the transponder programming section 206b defines a plurality of portions 206ba of the transponder programming section 206b in which there is no printing material. In an embodiment, the printing material may extend through the printing medium 204b from the front surface 204ba to the rear surface 204bb such that the printing material engages the transponder programming device 112 and the transponder programming cells 114. While the transponder programming cells 114 have been illustrated as a substantially rectangular array, a variety of different arrangements of the transponder programming cells 114 are envisioned such as, for example, arrangements which may be programmed by standard bar codes or dot codes, the programming which will be described in more detail below according to different embodiments.

The method 200 then proceeds to step 208 where the transponder apparatus 100 is coupled to an object. An object 208a is provided, and the transponder label 204c is coupled to the object 208a by, for example, using an adhesive located on the rear surface 204ab of the substrate 204a. The method 200 then proceeds to step 210 where the object 208a is identified with the transponder apparatus 100. A conventional reader transceiver (not shown) sends a signal which is received by the antenna 106 on transponder 102. That signal is sent by the antenna 106 to the power rectifier 108 and to the transceiver 104. The power rectifier 108 converts the signal into energy to power the different components of the transponder 102. The transceiver 104 receives the signal and sends it to the control logic device 110. The control logic device 110 then reads the transponder programming device 112, which has been programmed by the positioning of the printing material on the printing medium 204b in step 206 and will be explained in more detail below according to a variety of embodiments, and sends that information to the transceiver 104. The transceiver 104 then sends a signal including the information on the transponder programming device 112 to the reader transceiver using the antenna 106.

In an embodiment, the transponder programming cells 114 are photo-sensitive cells, and the transponder programming section 206b along with the portions 206ba of the transponder programming section 206b in which there is no printing material selectively block light from reaching some of the photo-sensitive transponder programming cells 114, as illustrated in FIG. 2f, such that the photo-sensitive transponder programming cells 114 contain the identifying information for the object 208a based on which photo-sensitive transponder programming cells 114 can detect light. The human-readable section 206c provided on the transponder label 204c in step 206 of the method 200 also includes identifying information corresponding to the object 208a. Thus, a method and apparatus are provided which allow a transponder to be labeled and programmed using a conventional printing device. In an embodiment, the use of photo-sensitive transponder programming cells 114 may provide additional security in the case in which the object 208a and the transponder label 204c are placed inside of an opaque container, as no light will reach any of the photo-sensitive transponder programming cells 114, preventing the information on the transponder 102 from being read.

In an embodiment, the transponder programming cells 114 are electromagnetic-sensitive cells, and the printing material provided in the printing member 206ab is a conventional magnetic ink, a conventional magnetic toner, or a variety of other conventional magnetic printing materials known in the art. The transponder programming section 206b will be detected by the electromagnetic-sensitive transponder programming cells 114 while the portions 206ba of the transponder programming section 206b in which there is no printing material will not be detected by the electromagnetic-sensitive transponder programming cells 114, as illustrated in FIG. 2f, such that the electromagnetic-sensitive transponder programming cells 114 contain the identifying information for the object 208a based on which electromagnetic-sensitive transponder programming cells 114 can detect the printing material. The human-readable section 206c provided on the transponder label 204c in step 206 of the method 200 also includes identifying information corresponding to the object 208a. Thus, a method and apparatus are provided which allow a transponder to be labeled and programmed using a conventional printing device using a magnetic printing material. In an embodiment, the use of electromagnetic-sensitive transponder programming cells 114 allows the transponder 102 to be read in a situation where there is no light on the transponder programming device 112.

In an embodiment, the transponder programming cells 114 are chemical-sensitive cells, and the printing material provided in the printing member 206ab is a printing material which may be detected by the chemical-sensitive cells. The transponder programming section 206b will be detected by the chemical-sensitive transponder programming cells 114 while the portions 206ba of the transponder programming section 206b in which there is no printing material will not be detected by the chemical-sensitive transponder programming cells 114, as illustrated in FIG. 2f, such that the chemical-sensitive transponder programming cells 114 contain the identifying information for the object 208a based on which chemical-sensitive transponder programming cells 114 can detect the printing material. The human-readable section 206c provided on the transponder label 204c in step 206 of the method 200 also includes identifying information corresponding to the object 208a. Thus, a method and apparatus are provided which allow a transponder to be labeled and programmed using a conventional printing device using a printing material which may be detected by the chemical-sensitive cells. In an embodiment, the use of chemical-sensitive transponder programming cells 114 allows the transponder 102 to be read in a situation where there is no light on the transponder programming device 112.

Figure 2H:
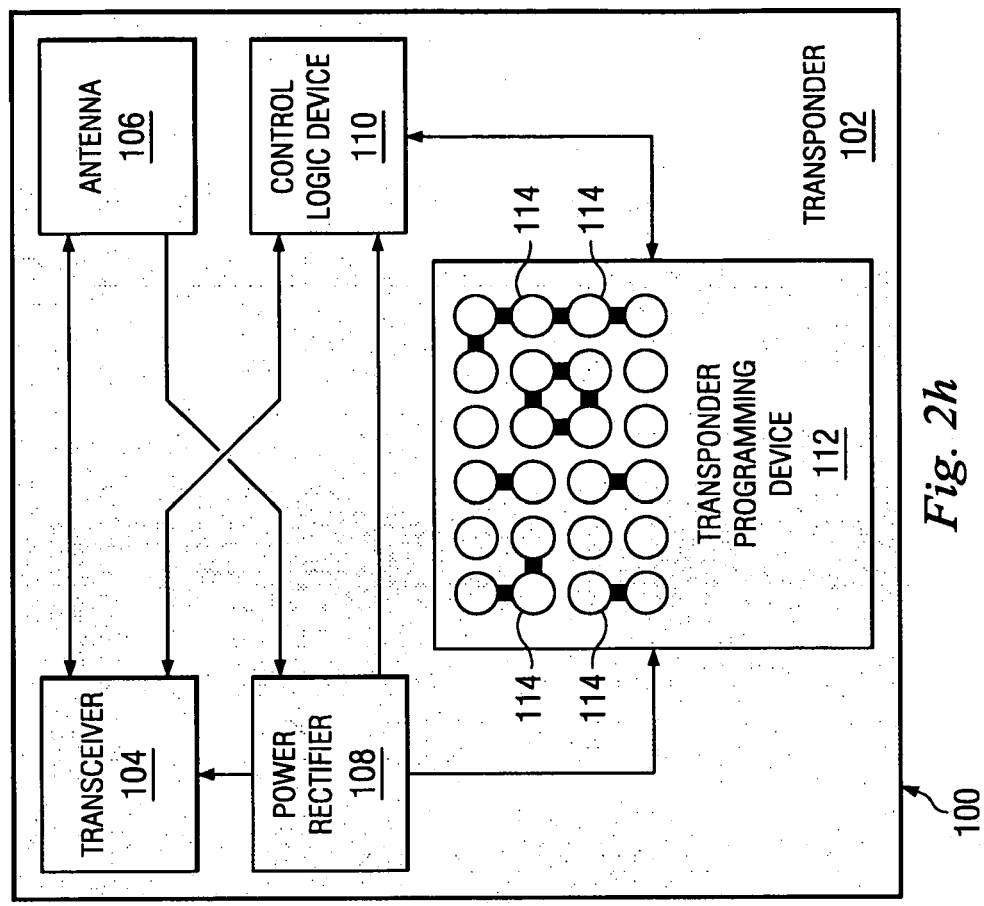
FIG. 2h is a schematic view illustrating an embodiment of a transponder apparatus programmed with a printing material positioned adjacent the transponder apparatus.
Figure 2G:
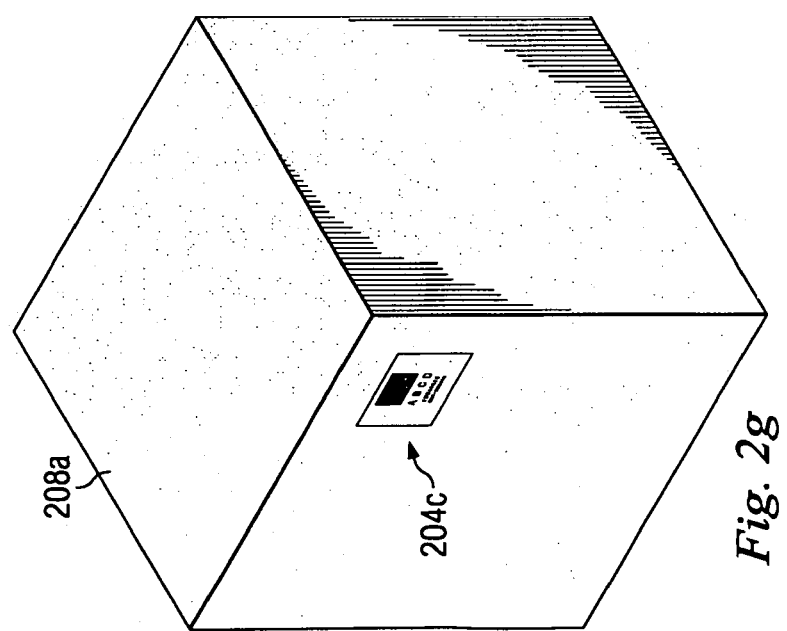
FIG. 2g is an perspective view illustrating an embodiment of the transponder label of FIG. 2 coupled to an object.

In an embodiment, the transponder programming cells 114 are conductive cells, and the printing material provided in the printing member 206ab is a conventional conductive ink, a conventional conductive toner, and/or a variety of other conductive printing materials known in the art. The transponder programming section 206b will provide a connection between different conductive transponder programming cells 114, as illustrated in FIG. 2h, such that the conductive transponder programming cells 114 contain the identifying information for the object 208a based on which conductive transponder programming cells 114 are connected together by the printing material. The human-readable section 206c provided on the transponder label 204c in step 206 of the method 200 also includes identifying information corresponding to the object 208a. Thus, a method and apparatus are provided which allow a transponder to be labeled and programmed using a conventional printing device using a conductive printing material. In an embodiment, the use of conductive transponder programming cells 114 allows the transponder 102 to be read in a situation where there is no light on the transponder programming device 112.

Figure 3:
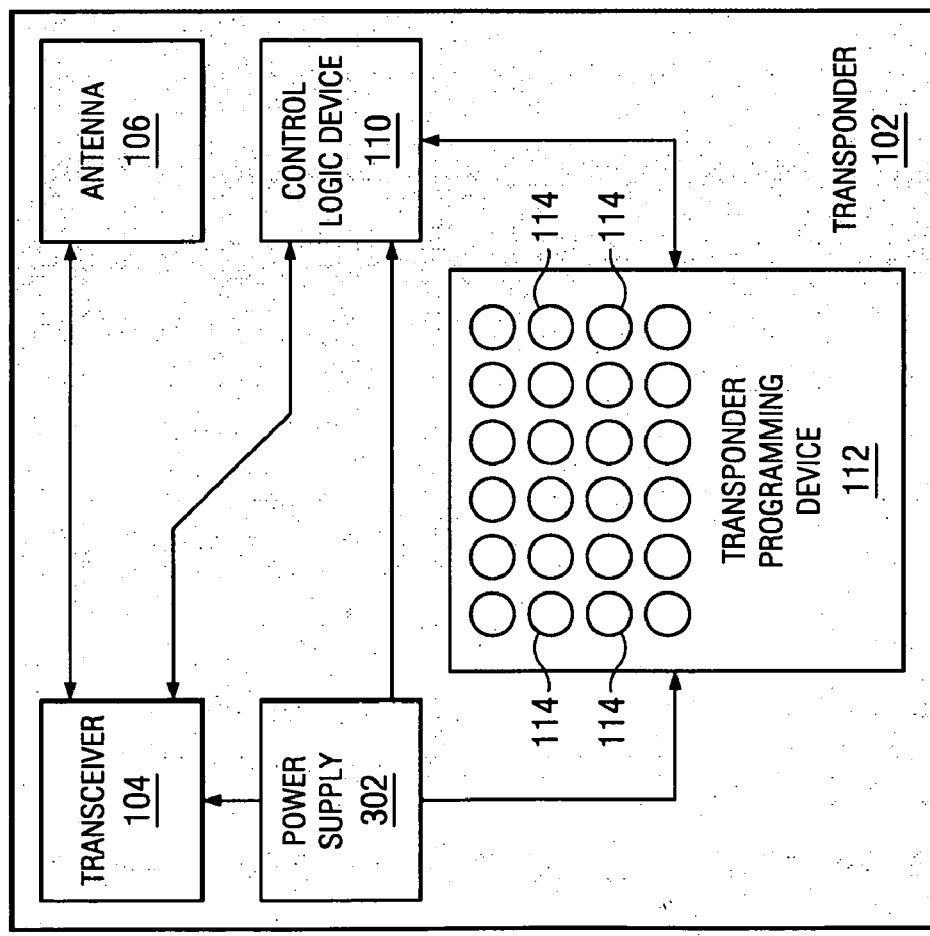
FIG. 3 is a schematic view illustrating an embodiment of a transponder apparatus.

Referring now to FIG. 3, in an embodiment, a transponder apparatus 300 is illustrated which is substantially similar in design and operation to the transponder apparatus 100, described above with reference to FIGS. 1, 2a, 2b, 2c, 2d, 2e, 2f, 2g, and 2h, with the provision of a conventional power supply 302 in place of the power rectifier 108. The conventional power supply 302 may be, for example, a battery, a solar cell operable to convert solar energy to electrical energy, and/or a variety of other power supplies known in the art. The power supply 302 is operably coupled to the transceiver 104 such that the power supply 302 may send power to the transceiver 104. The power supply 302 is operably coupled to the control logic device 110 such that the power supply 302 may send power to the control logic device 110. The power supply 302 is operably coupled to the transponder programming device 112 such that the power supply 302 may send power to the transponder programming device 112. In an embodiment, the power supply 302 allows the transponder 102 to be read by a reader transceiver from a greater distance than the transponder programming device 100.

Figure 4:
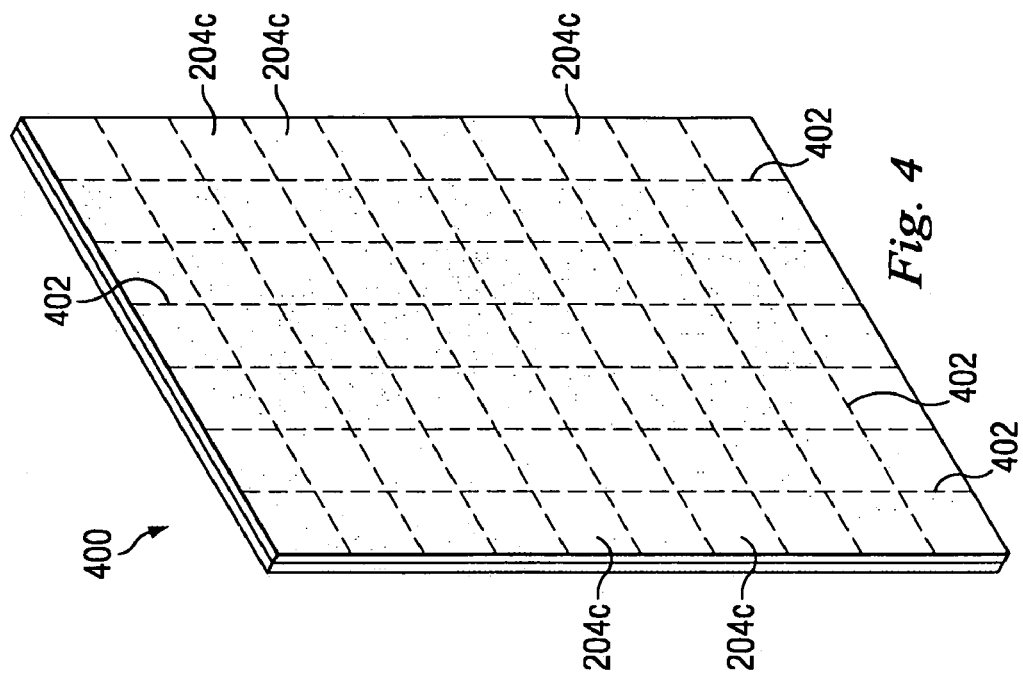
FIG. 4 is a schematic view illustrating an embodiment of a transponder apparatus.

Referring now to FIGS. 2b, 2c, and 4, in an embodiment, a sheet of transponder apparatus 400 is substantially similar in design and operation to the transponder apparatus 100 described above with reference to FIGS. 1, 2a, 2b, 2c, 2d, 2e, 2f, 2g, and 2h, with the provision of a plurality of transponder programming labels 204c included in a sheet. In an embodiment, the sheet of transponder apparatus 400 includes perforations 402 separating adjacent transponder programming labels 204c. The sheet of transponder apparatus 400 allows a conventional printing device to print and program a plurality of transponders for a plurality of different objects on a single sheet using the method 200 described above.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A radio frequency identification transponder apparatus, comprising:
   a transceiver;

a control logic device coupled to the transceiver; and
a transponder programming device coupled to the control logic device and operable to store information using a plurality of transponder programming cells, each transponder programming cell operable to delete a printed information material when the printed information material is positioned adjacent that transponder programming cell, wherein information stored on the transponder programming device is programmed on the transponder programming device by positioning the printed information material adjacent at least one of the transponder programming cells such that the information stored on the transponder programming device depends on the presence or absence of the printed information material adjacent the plurality of transponder programming cells.

2. The apparatus of claim 1, wherein the printed information material comprising a material that at least partially blocks lights, and the plurality of transponder programming cells comprise photo-sensitive cells that are operable to detect the presence or absence of light in order to detect the printed information material.

3. The apparatus of claim 1, wherein the printed information material comprises a magnetic material, and the plurality of transponder programming cells comprise electromagnetic-sensitive cells that are operable to detect the presence or absence of the magnetic material in order to detect the printed information material.

4. The apparatus of claim 1, wherein the printed information material comprises a conductive material, and the plurality of transponder programming cells comprise a plurality of conductive cells that are operable to detect a connection between the plurality of conductive cells through the conductive material in order to detect the printed information material.

5. The apparatus of claim 1, wherein the printed information material comprises a chemical material, and the plurality of transponder programming cells comprise chemical sensitive cells that are operable to detect the presence or absence of the chemical material in order to detect the printed information material.

6. The apparatus of claim 1, further comprising:
an antenna coupled to the transceiver.

7. The apparatus of claim 1, further comprising:
a power rectifier coupled to the transceiver, the control logic, and the transponder programming device.

8. The apparatus of claim 1, further comprising:
a power supply coupled to the transceiver, the control logic, and the transponder programming device.

9. A radio frequency identification transponder apparatus, comprising:
a substrate;
a transponder coupled to the substrate, the transponder comprising:
a transceiver;
a control logic device coupled to the transceiver; and
a transponder programming device coupled to the control logic device and operable to store information using a plurality of transponder programming cells each transponder programming cell operable to detect a printed information material when the printed information material is positioned adjacent that transponder programming cell; and
a printing medium coupled to the substrate and positioned adjacent the transponder, wherein information stored on the transponder programming device is programmed on the transponder programming device by positioning the printed information material on the printing medium adjacent at least one of the transponder programming cells such that the information stored on the transponder programming device depends on the presence or absence of the printed information material adjacent the plurality of transponder programming cells.

10. The apparatus of claim 9, wherein the substrate comprises an adhesive surface.

11. The apparatus of claim 10, further comprising:
a plurality of transponders coupled to the substrate, each transponder comprising:
a transceiver;
a control logic device coupled to the transceiver; and
a transponder programming device coupled to the control logic device and operable to store information using a plurality of transponder programming cells, each transponder programming cell operable to detect a printed information material when the printed information material is positioned adjacent that transponder programming cell, wherein information stored on the transponder programming device is programmed on the transponder programming device by positioning the printed information material on the printing medium adjacent at least one of the transponder programming cells such that the information stored on the transponder programming device depends on the presence or absence of the printed information material adjacent the plurality of transponder programming cells, and wherein the printing medium is coupled to the substrate and positioned adjacent the plurality of transponders.

12. The apparatus of claim 9, wherein the printed information material comprises a material that at least partially blocks light, and the plurality of transponder programming cells comprise photo-sensitive cells that are operable to detect the presence or absence of light in order to detect the printed information material.

13. The apparatus of claim 9, wherein the printed information material comprises a magnetic material, and the plurality of transponder programming cells comprise electromagnetic-sensitive cells that are operable to detect the presence or absence of the magnetic material in order to detect the printed information material.

14. The apparatus of claim 9, wherein the printed information material comprises a conductive material, and the plurality of transponder programming device comprises a plurality of conductive cells that are operable to detect a connection between the plurality of conductive cells through the conductive material in order to detect the printed information material.

15. The apparatus of claim 9, wherein the printed information material comprises a chemical material, and the plurality of transponder programming cells comprises chemical-sensitive cells that are operable to detect the presence or absence of the chemical material in order to detect the printed information material.

16. The apparatus of claim 9, further comprising:
an antenna coupled to the transceiver.

17. The apparatus of claim 9, further comprising:
a power rectifier coupled to the transceiver, the control logic, and the transponder programming device.

18. The apparatus of claim 9, further comprising:
a power supply coupled to the transceiver, the control logic, and the transponder programming device.

19. A method for programming a transponder, comprising:
providing a transponder comprising a transponder programming including a plurality of transponder programming cells that are each operable to detect a printed information material when the printed information material is positioned adjacent that transponder programming cell; and programming the transponder by positioning the printed information material adjacent at least one of the transponder programming cells such that information stored on the transponder programming device depends on the presence or absence of the printed information material adjacent the plurality of transponder programming cells.

20. The method of claim 19, wherein the programming comprises positioning the printed information material adjacent at least one of a plurality of photo-sensitive transponder programming cells on the transponder programming device in order to prevent light from reaching the at least one of the plurality of photo-sensitive transponder programming cells, and wherein the plurality of photo-sensitive transponder programming cells are operable to detect the presence or absence of light in order to detect the printed information material.

21. The method of claim 19, further comprising:
coupling the transponder to an object, wherein the programming comprises programming the transponder with identification information corresponding to the object.

22. The method of claim 21, further comprising:
identifying the object by receiving a signal from the transponder.

23. The method of claim 19, wherein the printed information material comprises a material that at least partially blocks light, and wherein the programming comprises positioning the printed information material adjacent at least one or a plurality of photo-sensitive transponder programming cells on the transponder programming device that are operable to detect the presence or absence of light in order to detect the printed information material.

24. The method of claim 19, wherein the printed information material comprises a magnetic material, and wherein the programming comprises positioning the printed information material adjacent at least one of a plurality of electromagnetic-sensitive transponder programming cells on the transponder programming device that are operable to detect the presence or absence of the magnetic material in order to detect the printed information material.

25. The method of claim 19, wherein the printed information material comprises a chemical material, and wherein the programming comprises positioning the printed information material adjacent at least one of a plurality of chemical-sensitive transponder programming cells on the transponder programming device that are operable to detect the presence or absence of the chemical material in order to detect the printed information material.

26. The method of claim 19, wherein the printed information material comprises a conductive material, and wherein the programming comprises positioning the printed information material adjacent at least one of a plurality of conductive transponder programming cells on the transponder programming device that are operable to detect a connection between the plurality of conductive transponder cells through the conductive material in order to detect the printed information material.

* * * * *

UNITED STATES PATENT AND TRADEMARK OFFICE
CERTIFICATE OF CORRECTION

PATENT NO. : 7,479,870 B2  Page 1 of 1
APPLICATION NO. : 11/401058
DATED : January 20, 2009
INVENTOR(S) : Jinsaku Masuyama et al.

It is certified that error appears in the above-identified patent and that said Letters Patent is hereby corrected as shown below:

Claim 2; Column 7; Line 18; delete "comprising" and insert --comprises--.

Claim 2; Column 7; Line 19; delete "lights" and insert --light--.

Claim 15; Column 8; Line 53; delete "comprises" and insert --comprise--.

Claim 19; Column 8; Line 67; after the word programming insert --device--.

Claim 23; Column 9; Line 31 through Column 10; Line 1; delete "or" and insert --of--.

Signed and Sealed this

Nineteenth Day of May, 2009

JOHN DOLL
*Acting Director of the United States Patent and Trademark Office*